United States Patent
Jung

(10) Patent No.: US 9,371,901 B2
(45) Date of Patent: Jun. 21, 2016

(54) PULLEY STRUCTURE OF BELT TYPE ELECTRIC POWER STEERING GEAR

(71) Applicant: MANDO Corporation, Pyeongtaek-si, Gyeonggi-do (KR)

(72) Inventor: Dae-Hee Jung, Goyang-si (KR)

(73) Assignee: MANDO CORPORATION, Pyeongtaek-Si (KR)

( * ) Notice: Subject to any disclaimer, the term of this patent is extended or adjusted under 35 U.S.C. 154(b) by 306 days.

(21) Appl. No.: 14/045,837

(22) Filed: Oct. 4, 2013

(65) Prior Publication Data

US 2014/0100070 A1    Apr. 10, 2014

(30) Foreign Application Priority Data

Oct. 5, 2012    (KR) .................. 10-2012-0110905

(51) Int. Cl.
| | |
|---|---|
| *F16H 55/30* | (2006.01) |
| *F16H 55/36* | (2006.01) |
| *B62D 5/04* | (2006.01) |
| *F16H 55/17* | (2006.01) |
| *F16H 55/48* | (2006.01) |
| *F16H 25/24* | (2006.01) |

(52) U.S. Cl.
CPC .............. *F16H 55/171* (2013.01); *F16H 55/36* (2013.01); *F16H 55/48* (2013.01); *F16H 25/24* (2013.01); *F16H 2055/363* (2013.01)

(58) Field of Classification Search
CPC ...... B62D 5/0424; B62D 5/0448; F16H 7/14; F16H 2025/2096; F16H 7/1281
USPC .................... 474/152, 166; 180/444
See application file for complete search history.

(56) References Cited

U.S. PATENT DOCUMENTS

| | | | | |
|---|---|---|---|---|
| 4,825,972 A | * | 5/1989 | Shimizu ............... | B62D 5/0466 180/444 |
| 6,644,432 B1 | * | 11/2003 | Yost ..................... | B62D 5/0448 180/444 |

(Continued)

FOREIGN PATENT DOCUMENTS

| | | |
|---|---|---|
| JP | 08100854 A | 4/1996 |
| JP | 2583230 Y | 8/1998 |

(Continued)

OTHER PUBLICATIONS

Korean Office Action issued on Aug. 4, 2015 in connection with the counterpart Korean Patent Application No. 10-2012-0110905.

(Continued)

*Primary Examiner* — Henry Liu
(74) *Attorney, Agent, or Firm* — Hauptman Ham, LLP

(57) ABSTRACT

Provided is a pulley structure of a belt type electric power steering (EPS) gear, and more particularly, a pulley structure of a belt type EPS gear capable of providing good assemblability using an engineering plastic and a specific structure. The pulley structure of the belt type EPS gear includes an insert ring section coupled to a ball nut, a support section configured to support the insert ring section, a first flange section configured to prevent separation of a belt, a pulley having a driving section configured to receive a driving force of the belt, a support frame disposed at one side surface of the driving section and having a bent shape to have an internal space when coupled to the ball nut, and a second flange section disposed at one side surface of the support frame and configured to prevent separation of the belt.

7 Claims, 4 Drawing Sheets

A-A

(56) References Cited

U.S. PATENT DOCUMENTS

| | | | | |
|---|---|---|---|---|
| 6,691,819 B2* | 2/2004 | Menjak | B62D 5/008 180/444 |
| 6,883,635 B2* | 4/2005 | Lynn | B62D 5/0448 180/443 |
| 6,938,722 B2* | 9/2005 | Sasaki | B62D 5/0424 180/443 |
| 6,960,145 B2* | 11/2005 | Fraley, Jr. | B62D 5/0424 180/444 |
| 7,055,646 B2* | 6/2006 | Bugosh | B62D 5/0448 180/443 |
| 7,189,176 B2* | 3/2007 | Sakaida | B62D 5/0424 474/148 |
| 7,191,866 B2* | 3/2007 | Sasaki | B62D 5/0424 180/443 |
| 7,237,647 B2* | 7/2007 | Nakamura | B62D 5/0424 180/444 |
| 7,278,334 B2* | 10/2007 | Saruwatari | B62D 5/0412 180/444 |
| 7,360,624 B2* | 4/2008 | Nagamatsu | B62D 5/0424 180/444 |
| 7,392,879 B2* | 7/2008 | Imagawa | B62D 5/0403 180/444 |
| 7,413,052 B2* | 8/2008 | Sasaki | B62D 5/0424 180/444 |
| 7,510,045 B2* | 3/2009 | Bareis | B62D 5/0424 180/443 |
| 7,591,204 B2* | 9/2009 | Ueno | B62D 5/0409 74/388 PS |
| 8,360,910 B2* | 1/2013 | Leutner | B62D 5/04 180/444 |
| 8,789,648 B2* | 7/2014 | Lee | B62D 5/0427 180/444 |
| 2002/0148673 A1* | 10/2002 | Menjak | B62D 5/0424 180/444 |
| 2003/0192734 A1* | 10/2003 | Bugosh | B62D 5/0448 180/444 |
| 2004/0007417 A1* | 1/2004 | Lynn | B62D 5/0448 180/444 |
| 2004/0043854 A1* | 3/2004 | Fraley, Jr. | B62D 5/0424 474/134 |
| 2005/0133297 A1* | 6/2005 | Chikaraishi | B62D 5/0424 180/444 |
| 2005/0192143 A1* | 9/2005 | Sasaki | B62D 5/0424 474/101 |
| 2005/0197224 A1* | 9/2005 | Sasaki | B62D 5/0424 474/116 |
| 2005/0247514 A1* | 11/2005 | Heitzer | F16H 7/14 180/444 |
| 2006/0183583 A1* | 8/2006 | Sakaida | B62D 5/0424 474/70 |
| 2007/0256883 A1* | 11/2007 | Budaker | B62D 5/0424 180/400 |
| 2008/0081718 A1* | 4/2008 | Collier-Hallman | F16H 7/1281 474/110 |
| 2012/0000446 A1* | 1/2012 | Venton-Walters | F16D 1/101 123/564 |
| 2014/0090921 A1* | 4/2014 | Shavrnoch | F16H 25/2204 180/444 |

FOREIGN PATENT DOCUMENTS

| | | |
|---|---|---|
| JP | 2005212654 A | 8/2005 |
| JP | 2005282642 A | 10/2005 |
| JP | 2005329913 A | 12/2005 |
| KR | 100726588 B1 | 6/2007 |
| WO | 2011117099 A1 | 9/2011 |

OTHER PUBLICATIONS

Chinese Office Action issued on Aug. 18, 2015 in connection with the counterpart Chinese Patent Application No. 201310464157.5.

Korean Office Action dated Feb. 15, 2016 in connection with the counterpart Korean Patent Application No. 10-2012-0110905.

* cited by examiner

A-A

PULLEY STRUCTURE OF BELT TYPE ELECTRIC POWER STEERING GEAR

CROSS-REFERENCE TO RELATED APPLICATION

This application claims priority to and the benefit of Korean Patent Application No. 10-2012-0110905, filed on Oct. 5, 2012, the disclosure of which is incorporated herein by reference in its entirety.

BACKGROUND

1. Field of the Invention

The present invention relates to a pulley structure of a belt type electric power steering (EPS) gear, and more particularly, to a pulley structure of a belt type EPS gear capable of providing good assemblability using an engineering plastic and a specific structure.

2. Discussion of Related Art

A power steering apparatus for a vehicle functions to assist with a steering force such that a driver can steer a handle with a small force when steering the vehicle. In power steering apparatuses, an apparatus using a method utilizing a rotating force of a motor having a function of assisting with the steering force is referred to as an electric power steering (EPS) apparatus.

The EPS apparatus detects the steering force of the driver and rotates the motor to assist with the steering force in a direction in which the driver wants to steer. In the EPS apparatus, a belt type EPS apparatus for transmitting a rotating force of a motor shaft through a timing belt uses the timing belt as a unit that connects the motor shaft to a rack bar driving apparatus to reduce a rotating speed of the motor shaft and transmit the rotating force.

A pulley is used to transmit the driving force of the belt to a ball nut, and a conventional pulley structure has a structure to be described below.

FIGS. 1 and 2 show a nut pulley structure of a conventional belt type power steering gear, illustrating a nut pulley 1 including a flange 3 configured to prevent separation of a driving section 2 of a belt from the belt. The nut pulley 1 is connected to a ball nut 5, and one side surface of the nut pulley 1 comes in contact with a fixing section 4 to be fixed thereto.

FIG. 1 shows a state in which the nut pulley of the conventional belt type power steering gear is coupled to the ball nut 5, and FIG. 2 is a view for describing a coupling method of the nut pulley 1 and the ball nut 5.

A tolerance ring 6 is disposed at one side surface of the ball nut to cross the ball nut, and coupled in a manner in which the nut pulley 1 is press-fitted to be fixed by a 3-dimensional structure of the tolerance ring 6. The tolerance ring 6 having a protrusion shape is disposed in a direction opposite to a circumferential direction of the ball nut 5, and the tolerance ring 6 is coupled to an inner surface of the nut pulley 1 to be fixed by the fixing section 4.

Since the conventional gear pulley structure cannot be easily manufactured with a flange integrated with the nut pulley using a sintered material, a press-fitting process of the flange should be separately performed.

In addition, a metallic material is used to excessively increase the weight, and weight reduction of the belt type power steering is severely limited.

SUMMARY OF THE INVENTION

In order to solve such problems, the present invention is directed to provide a pulley structure of a belt type electric power steering (EPS) gear including an insert ring section coupled to a ball nut, a support section configured to support the insert ring section, a first flange section configured to prevent separation of a belt, a pulley having a driving section configured to receive a driving force of the belt, a support frame disposed at one side surface of the driving section and having a bent shape to have an internal space when coupled to the ball nut, and a second flange section disposed at one side surface of the support frame and configured to prevent separation of the belt.

According to an aspect of the present invention, there is provided a pulley structure having a pulley used in a belt type EPS gear used in a vehicle, which includes an insert ring section coupled to a ball nut, a support section configured to support the insert ring section, a first flange section configured to prevent separation of a belt, a pulley having a driving section configured to receive a driving force of the belt, a support frame disposed at one side surface of the driving section and having a bent shape to have an internal space upon coupling to the ball nut, and a second flange section disposed at one side surface of the support frame and configured to prevent separation of the belt.

In addition, the insert ring section may be constituted by a male thread disposed at the ball nut and a female thread disposed at the pulley.

Further, the pulley structure may further include a support frame fixing member configured to fix the support frame.

Furthermore, the support frame fixing member may be a lock nut or a snap ring.

In addition, the pulley may be formed of engineering plastic.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Exemplary embodiments of the present invention will be described in detail below with reference to the accompanying drawings. While the present invention is shown and described in connection with exemplary embodiments thereof, it will be apparent to those skilled in the art that various modifications can be made without departing from the spirit and scope of the invention.

Figure 1:
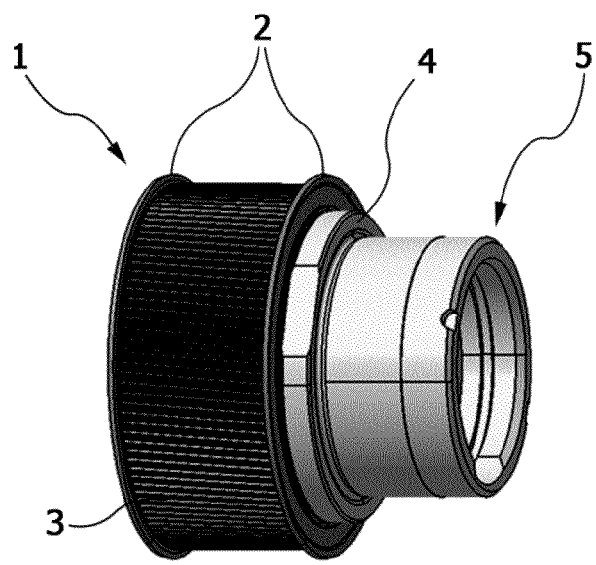
FIG. 1 is a perspective view of a nut pulley structure of a conventional belt type power steering gear, showing a state in which a pulley is coupled to a ball nut.
Figure 2:
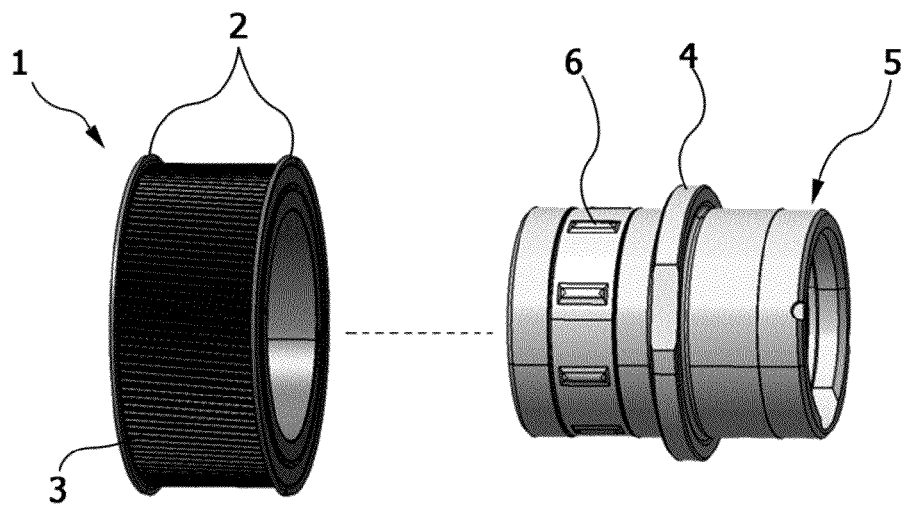
FIG. 2 is a perspective view of the nut pulley structure of the conventional belt type power steering gear, showing a state in which the ball nut and the pulley are separated.
Figure 3:
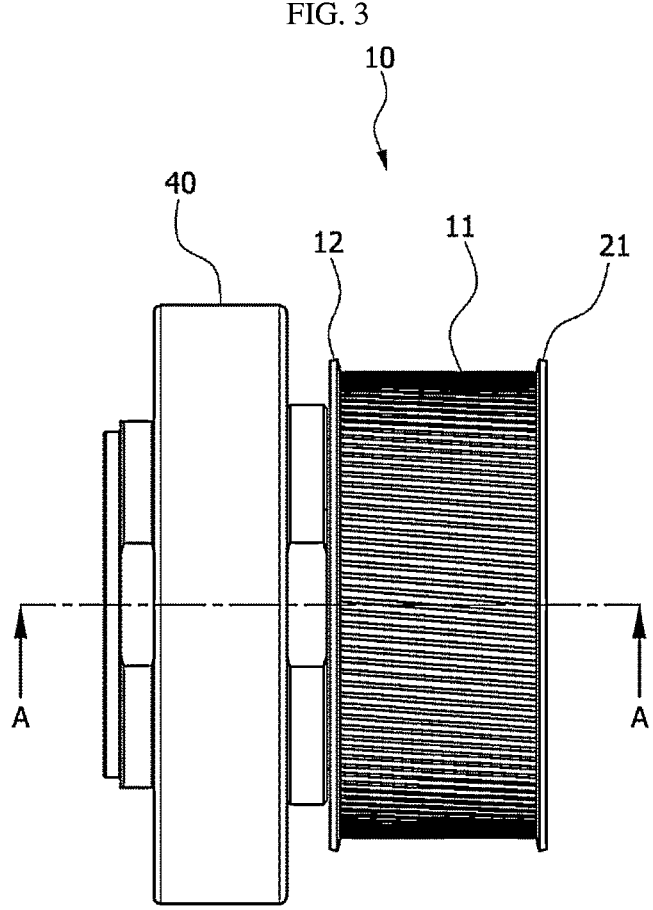
FIG. 3 is a front view showing a coupled state of a belt type power steering gear according to the present invention.
Figure 4:
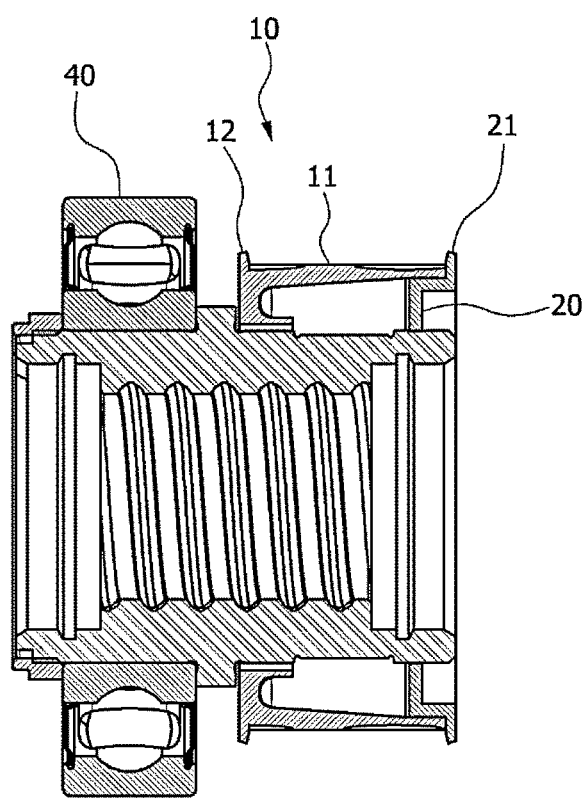
FIG. 4 is a cross-sectional view taken along line A-A of FIG. 3.
Figure 5:
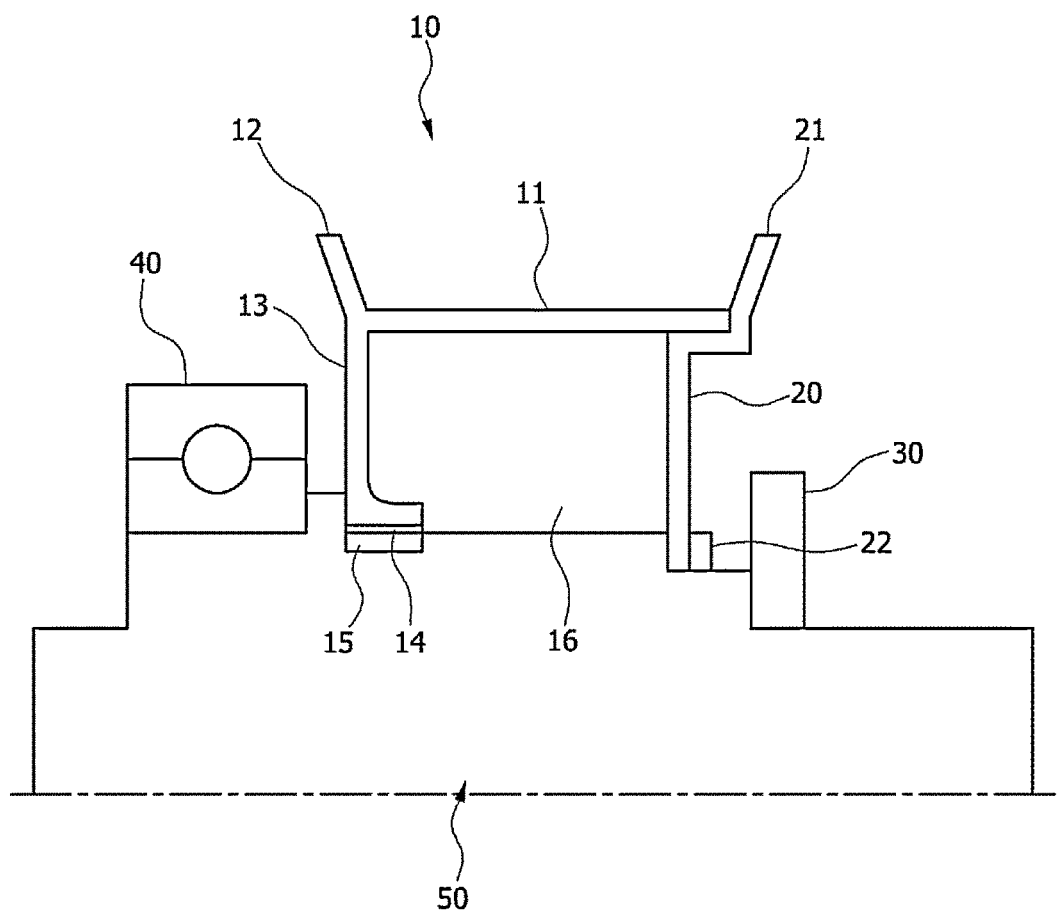
FIG. 5 is an enlarged cross-sectional view of a pulley structure of the belt type power steering gear according to the present invention.

FIG. 3 is a front view showing a coupled state of a belt type power steering gear according to the present invention, FIG. 4 is a cross-sectional view taken along line A-A of FIG. 3, and FIG. 5 is an enlarged cross-sectional view of a pulley structure of the belt type power steering gear according to the present invention.

A pulley 10 is an apparatus coupled to a ball nut 50 and configured to transmit a rotating force of a motor, and includes insert ring sections 14 and 15 configured to be coupled to the ball nut 50. The insert ring sections 14 and 15 are constituted by a female thread 14 disposed at the pulley 10 and a male thread 15 disposed at the ball nut 50, which function to connect the ball nut and the pulley, instead of a conventional tolerance ring. While the conventional pulley structure employs a method of coupling the pulley to the ball nut by a 3-dimensional structure of the tolerance ring, an excessive force should be applied during assembly of products having such a structure, and an excessive load is applied to the tolerance ring in the assembly, which decreases durability of the pulley.

In the present invention, in order to overcome these problems, the insert ring sections 14 and 15 are provided to increase assembly convenience of the belt type power steering gear. As a result, immediate fastening with a tap becomes possible due to the insert ring sections 14 and 15.

The pulley 10 is constituted by a driving section 11, a first flange section 12, a support section 13 and the insert ring sections 14 and 15. The driving section 11, into which the belt is inserted, functions to transmit the driving force of the motor to the ball nut 50. The driving section 11 is generally formed in a gear tooth structure, and has a shape corresponding to a tooth shape of the belt.

The support section 13 functions to support the insert ring sections 14 and 15, and has a structure having an internal space 16 formed therein and disposed between the pulley 10 and the ball nut 50 together with a support frame 20. Since the conventional pulley structure cannot have the internal space 16, weight reduction of the belt type power steering gear has been difficult. However, in the present invention, the support section 13 and the support frame 20 are provided to use the internal space 16 as an empty space, and the weight of the belt type power steering gear can be reduced to an extent of the internal space 16.

The first flange section 12 functions to prevent separation of the belt upon driving. In the conventional pulley structure, the pulley is manufactured using a sintered material. Accordingly, it is difficult to integrally manufacture the flange portion, and the flange section is manufactured through a separate press-fitting process. However, since the pulley structure according to the present invention can be manufactured through an injection molding method, the first flange section 12 can be integrally manufactured, and a structure preventing separation of the belt can be provided.

The support frame 20 is provided to support the pulley 10 at one side surface of the driving section 11 after the pulley 10 is fastened to the ball nut 50. The support frame 20 functions to provide the internal space 16, and makes the driving section 11 of the pulley 10 flush with the ball nut 50 to smoothly transmit the driving force of the belt.

The support frame 20 is bent in a substantially "]" shape and has a structure configured to support the driving section 11. A second flange section 21 is connected to one end of the driving section 11, and the second flange section 21 is disposed in a direction corresponding to the first flange section 12 to prevent separation of the belt outward from the pulley 10 upon driving of the belt, enabling more precise steering. The support frame 20 may be formed of the same material as or a different material from the pulley 10. The pulley 10 is generally formed of engineering plastic (EP), but the support frame 20 may be formed of the EP or a metallic material.

In order to fix the support frame 20, a support frame fixing member 22 is needed and the support frame fixing member 22 may have a lock nut or snap ring shape. The support frame fixing member 22 should be disposed to prevent transmission of vibrations and impacts on the support frame 20 due to rotation of the belt and separation of the support frame 20 from the ball nut 50 due to the vibrations and impacts.

While the conventional pulley structure is formed of the sintered material, which may cause difficulties in integral manufacture of the flange portion, the pulley structure of the present invention can be manufactured using the engineering plastic through an injection molding method, and flange sections can be integrally manufactured at each of the support section 13 and the support frame 20. The first flange section 12 is disposed at an end of the pulley 10 and slightly inclined outward. The second flange section 21 is disposed at an end of the support frame 20 and inclined in a direction opposite to the first flange section 12.

A fixing section 30 functions to fix the pulley 10 and the support frame 20 such that the pulley 10 and the support frame 20 are not moved even when the belt is rotated, and functions to assist the support frame fixing member 22.

A 4P bearing 40, disposed to provide a space with one side of the support section 13 of the pulley 10, is coupled to one side surface of the ball nut 50 and functions to smoothly drive the ball nut 50.

As described above, the pulley structure of the belt type electric power steering (EPS) gear according to the present invention is provided to overcome disadvantages of the conventional pulley structure using the sintered material, and has advantages for weight reduction of the EPS in that the injection molding method can be applied and an internal space providing an empty space in the pulley is provided. In addition, the flange and the support structure can be integrated to reduce the number of parts, and inclination of the flange section can be adjusted to prevent separation of the belt in comparison with the conventional pulley structure.

In addition, in comparison with the conventional art in which cylindricity of a tooth surface and an assembly surface of the pulley is restricted, the same effect can be obtained by restriction of concentricity.

As can be seen from the foregoing, since the pulley of the pulley structure of the belt type power steering gear according to the present invention can be manufactured through the injection molding method, the engineering plastic can be used and the EPS gear can be reduced in weight.

In addition, the flange section and the support frame are configured as an integrated structure to reduce the number of parts, providing convenience of assembly.

Further, in comparison with the conventional art in which cylindricity of a tooth surface and an assembly surface of the pulley is restricted, the same effect can be obtained by restriction of concentricity.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A pulley structure for a belt type electric power steering (EPS) gear of a vehicle, the pulley structure comprising:
   insert ring sections coupled to a ball nut;
   a support section configured to support the insert ring sections;

a first flange section configured to prevent separation of a belt;

a pulley configured to be used in the belt type EPS gear, the pulley having a driving section configured to receive a driving force of the belt;

a support frame disposed at one side surface of the driving section and having a shape bent to provide an internal space when coupled to the ball nut; and a second flange section disposed at one side surface of the support frame and configured to prevent separation of the belt, wherein the insert ring sections, the support section, the first flange section and the pulley are integrally formed with each other.

2. The pulley structure according to claim 1, wherein the insert ring sections are constituted by a male thread disposed at the ball nut and a female thread disposed at the pulley.

3. The pulley structure according to claim 1, further comprising a support frame fixing member configured to fix the support frame.

4. The pulley structure according to claim 3, wherein the support frame fixing member is a lock nut or a snap ring.

5. The pulley structure according to claim 1, wherein the pulley is formed of engineering plastic.

6. The pulley structure according to claim 2, wherein the female thread and the support section are integrally formed.

7. The pulley structure according to claim 1, wherein the support section has a bent having L-shaped cross section at one end portion, the insert ring sections are installed at the bent of the support section.

\* \* \* \* \*